US 9,616,801 B2

(12) United States Patent
Williams

(10) Patent No.: US 9,616,801 B2
(45) Date of Patent: Apr. 11, 2017

(54) STRAP WINCH WINDING DEVICE

(71) Applicant: Douglas Williams, Bluffton, SC (US)

(72) Inventor: Douglas Williams, Bluffton, SC (US)

(73) Assignee: Strap Commander, LLC, Bluffton, SC (US)

( * ) Notice: Subject to any disclaimer, the term of this patent is extended or adjusted under 35 U.S.C. 154(b) by 0 days.

(21) Appl. No.: 14/825,413

(22) Filed: Aug. 13, 2015

(65) Prior Publication Data
US 2016/0046228 A1    Feb. 18, 2016

Related U.S. Application Data

(60) Provisional application No. 62/036,664, filed on Aug. 13, 2014.

(51) Int. Cl.
*B60P 7/08*    (2006.01)
(52) U.S. Cl.
CPC ........... *B60P 7/0853* (2013.01); *B60P 7/0846* (2013.01)
(58) Field of Classification Search
CPC ............................. B60P 7/0853; B60P 7/0846
USPC ............ 410/12, 96, 100, 103; 254/223, 243; 24/68 CD
See application file for complete search history.

(56) References Cited

U.S. PATENT DOCUMENTS

| 6,729,604 | B1 | 5/2004 | Claycomb |
| 7,278,808 | B1 | 10/2007 | Sisk, Sr. et al. |
| 7,410,336 | B2 * | 8/2008 | Parks .................... B60P 7/0846 410/103 |

* cited by examiner

Primary Examiner — Stephen Gordon
(74) Attorney, Agent, or Firm — Dority & Manning, P.A.

(57) ABSTRACT

A winding device including a spindle and an inner cylinder is provided, the inner cylinder is positioned at least partially in a first opening of the spindle extending along an axial direction and is rotatable between a first position and a second position relative to the spindle. The winding device additionally includes an engagement bolt positioned in a second opening of the spindle extending along a radial direction and mechanically engaged with the inner cylinder. Rotation of the inner cylinder between the first position and the second position automatically extends or retracts the engagement bolt along the radial direction. When the engagement bolt is extended, the winding device is in an engaged position and configured to rotate a collar of a strap winch, and when the engagement bolt is retracted, the winding device is in a disengaged position and configured to be removed from or inserted into the collar of the strap winch.

11 Claims, 4 Drawing Sheets

# STRAP WINCH WINDING DEVICE

PRIORITY CLAIM

This application claims the benefit of priority of U.S. Provisional Patent Application 62/036,664, filed Aug. 13, 2014, which is incorporated herein by reference for all purposes.

FIELD OF THE INVENTION

The present disclosure generally relates to a device for assisting in winding a strap winch, such as a strap winch for a cargo transportation truck.

BACKGROUND OF THE INVENTION

Cargo transportation trucks generally employ a number of cargo straps for strapping down various cargos to assist in preventing such cargos from moving during transportation. For example, such a truck may employ a dozen or more straps holding down a particular cargo. Each of these straps generally includes a base end and a distal end. The base end of the strap is generally fed through a strap winch welded or otherwise attached to a first side of the truck and the distal end generally includes a hook or other device adapted for attaching to a second and opposite side of the truck.

Each of the strap winches generally includes a bracket and an axle rotatably mounted to the bracket. The axle extends between a ratchet assembly at one end and a tightening collar at another end. Additionally, the axle generally includes a longitudinal slot for receipt of the base end of the strap. The tightening collar is hand-wound by, e.g., the driver of the truck, winding the strap around the axle until the tension in the strap is more than the driver of the truck can overcome with his hands. A breaker bar may then be used to tighten the strap winch further. The breaker bar fits into one or more engagement holes in the collar to provide the user with additional torque for further tightening the winch.

However, certain problems may exist with the above configuration. For example, as there may be a number of winches that require tightening, it can be overly time consuming for the driver of the truck to tighten each individual strap by hand. While adaptors have been developed for assisting the driver in tightening the strap winches, certain problems remain with these configurations.

For example, U.S. Pat. No. 7,278,808 to Sisk, Sr. et al. describes an apparatus configured to attach to the collar of a strap winch from an outer circumference of such collar. Such a configuration may be inconveniently bulky and may present a greater safety concern as objects, including the driver's clothing, may more easily be easily trapped between the adapter and the outer circumference of the collar. Additionally, U.S. Pat. No. 6,729,604 to Claycomb describes an apparatus configured to be received within the collar of the strap winch. However, this design requires a user to manually press in and retract a pin before the apparatus may be inserted into the collar, and similarly to manually press in and retract the pin before removal of the apparatus. Such may be a cumbersome requirement when repeated several dozen times per trip and may provide an increased opportunity for, e.g., the driver's hand and/or glove to be pinched and/or caught between the apparatus and the collar of the strap winch. Moreover, such an apparatus relies on a single spring for operation and thus may be less durable as certain springs may lose effectiveness after repetitive use.

Accordingly, a need exists for an apparatus that could assist a user in winding a collar of a strap winch. More particularly, a durable and convenient apparatus for assisting a user in winding a collar of a strap winch would be particularly beneficial.

BRIEF DESCRIPTION OF THE INVENTION

Aspects and advantages of the invention are set forth below in the following description, or may be obvious from the description, or may be learned through practice of the invention.

In one embodiment of the present disclosure, a winding device is provided configured for use with a collar of a strap winch. The winding device defines an axial direction and a radial direction. Additionally, the winding device includes a spindle extending along the axial direction between a first end and a second end. The spindle is configured for receipt into the collar of the strap winch at the second end. The spindle also defines a first opening at the first end extending along the axial direction and a second opening between the first end and the second end extending along the radial direction. The winding device also includes an inner cylinder positioned at least partially in the first opening of the spindle and rotatable about the axial direction between a first position and a second position relative to the spindle. The winding device also includes an engagement bolt positioned at least partially in the second opening of the spindle and mechanically engaged with the inner cylinder. Rotation of the inner cylinder from the first position to the second position extends at least a portion of the engagement bolt outwardly along the radial direction from within the second opening in the spindle.

In one exemplary aspect of the present disclosure, a method of winding a strap winch using a winding device is provided. The method includes inserting a spindle of the winding device into a collar of the strap winch. The method also includes rotating an inner cylinder of the winding device from a first position to a second position relative to the spindle such that the winding device is in an engaged position. The inner cylinder is positioned at least partially in a first opening of the spindle extending along an axial direction of the winding device. The method also includes rotating the inner cylinder in a tightening direction, the inner cylinder rotating the winding device, and the winding device rotating the collar of the strap winch.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
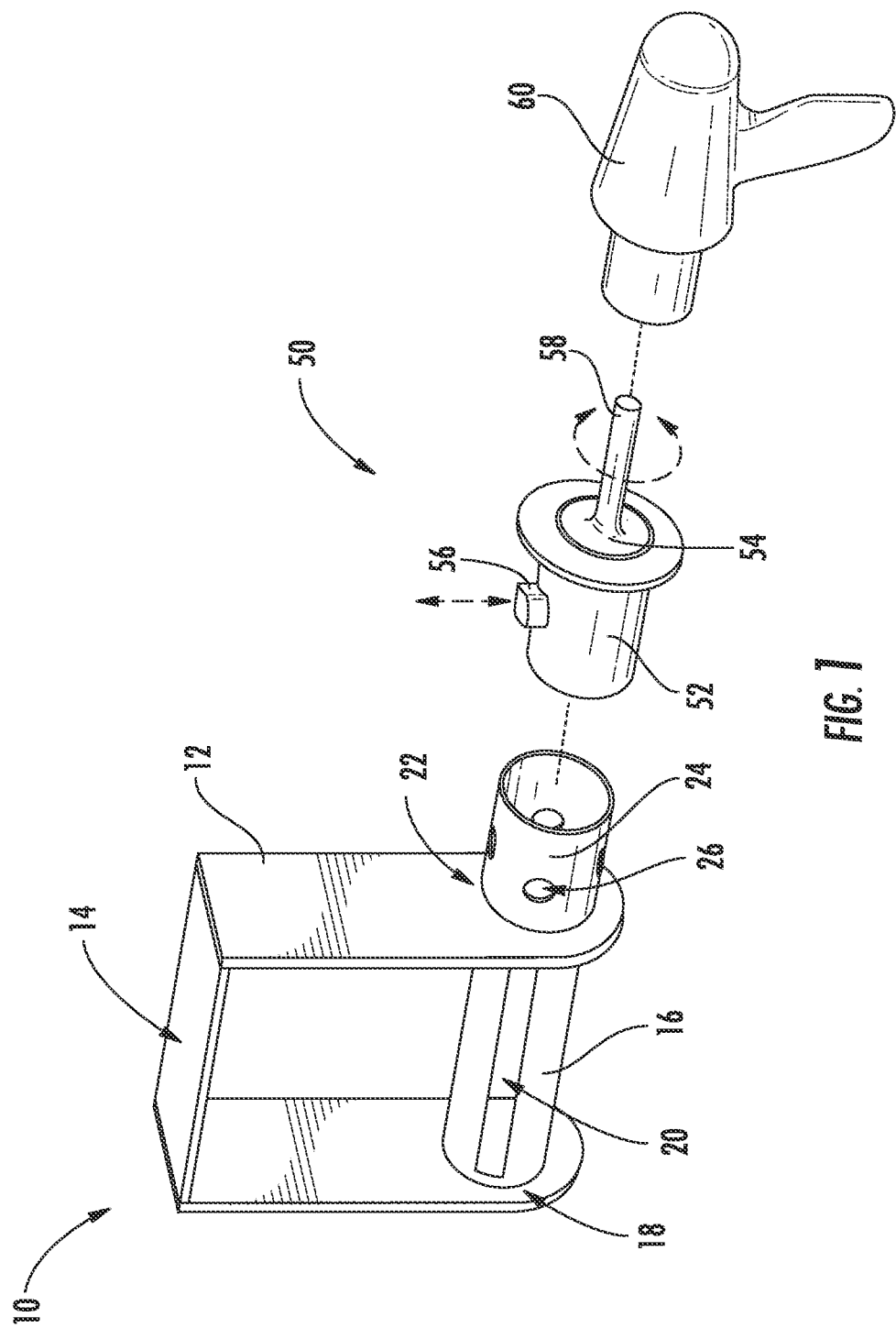
FIG. 1 is a perspective view of a strap winch and a winding device in accordance with an exemplary embodiment of the present disclosure.

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present invention without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents. Although exemplary embodiments of the present invention will be described In one exemplary embodiment, a winding device is provided including a spindle and an inner cylinder, the inner cylinder positioned at least partially in a first opening of the spindle extending along an axial direction. The inner cylinder is rotatable between a first position and a second position relative to the spindle. The winding device additionally includes an engagement bolt positioned in a second opening of the spindle extending along a radial direction. The engagement bolt is mechanically engaged with the inner cylinder. Rotation of the inner cylinder between the first position and the second position automatically extends or retracts the engagement bolt along the radial direction. When the engagement bolt is extended, the winding device is in an engaged position and is configured to rotate a collar of a strap winch. By contrast, when the engagement bolt is retracted, the winding device is in a disengaged position and is configured to be removed from or inserted into the collar of the strap winch.

Referring now to the drawings, FIG. 1 provides a perspective view of a strap winch 10 and a winding device 50 in accordance with an exemplary embodiment of the present disclosure. The strap winch 10 depicted in FIG. 1 generally includes a bracket 12 with a mounting surface 14 configured to be welded or otherwise attached to a surface of, for example, a bed of a cargo transportation truck, such as a flatbed trailer of a cargo transportation truck (not shown). The strap winch 10 further includes an axle 16 rotatably mounted to the bracket 12. A first end 18 of the axle 16 may include a ratchet assembly (not shown) configured to only allow the axle 16 to rotate in a tightening direction unless a lever of the ratchet assembly is actuated. Extending longitudinally through a center of the axle 16 is a slot 20 for receipt of a cargo strap. For the embodiment of FIG. 1, the slot 20 extends substantially along an entire length of the axle 16 within the bracket 12. A second side 22 of the axle 16 is attached to or configured as a collar 24. The collar 24 defines a plurality of circumferentially spaced engagement holes 26. The collar 24 is rotationally fixed to the axle 16, such that rotation of the collar 24 additionally rotates the axle 16.

Although not shown in the Figs., when the strap winch 10 is mounted to, for example, a bed of a cargo transportation truck, a distal end of the cargo strap may be attached to one side of the trailer, while a base end of the cargo strap may be received within the slot 20 of the axle 16. The collar 24 may then be rotated by a user, such as the driver of the truck, in a clockwise or other tightening direction, rotating the strap around the axle 16 and tightening the strap. The ratchet assembly, if included, may prevent the strap winch 10 from loosening while the strap is tightened.

It should be appreciated, however, that the strap winch 10 of FIG. 1 is provided by way of example only, and in other exemplary embodiments, the strap winch 10 may have any other suitable configuration and may be mounted in any suitable location. For example, in other exemplary embodiments, the strap winch 10 may have any other suitable bracket 12 configuration for mounting to a surface. Alternatively, the bracket 12 may be made integrally with a surface, such as a bed of a cargo transportation truck. Additionally, in still other embodiments, the strap winch 10 may not include the slot 20 depicted in the figures, and instead may include any other suitable means for attaching the strap to the axle 16, such as a clamp or hook. Alternatively, the axle 16 may not include any additional structure for attaching the strap to the axle 16, and instead the strap may simply be configured to wrap over itself and clamp itself onto the axle 16. Moreover, in still other exemplary embodiments, the strap winch 10 may include any suitable device to prevent the axle 16 from rotating in a loosening direction until such rotation is initiated by a user. Such a device may be configured alongside the collar 24 or in other embodiments, may be within the axle 16. Furthermore, the collar 24 may include any suitable number and/or size of engagement holes 26, and although the engagement holes 26 are generally depicted as being evenly spaced in pairs opposite one another, in still other embodiments, the holes 26 may have any other suitable spacing.

Referring still to FIG. 1, the exemplary winding device 50 is configured for use with the collar 24 of the strap winch 10. The winding device 50 generally includes a spindle 52, an inner cylinder 54 positioned at least partially within the spindle 52, and an engagement bolt 56. For the embodiment depicted, the inner cylinder additionally includes a shaft 58 extending along the axial direction A (see FIG. 2) configured for attachment to a drive apparatus 60. In certain exemplary embodiments, the drive apparatus 60 may be, for example, a corded or cordless power drill, a ratchet, or other rotational tool. However, in other embodiments, the winding device 50 and the drive apparatus 60 may instead be a single integrated device, such that a separate drive apparatus 60 and winding device 50 are not required.

As will be explained in greater detail below with reference to FIGS. 2-4, the spindle 52 of the winding device 50 is configured for receipt into the collar 24 of the strap winch 10. Additionally, the engagement bolt 56 is configured to automatically extend outwardly along a radial direction R into engagement with at least one of the engagement holes 26 defined in the collar 24 in response to the shaft 58 and inner cylinder 54 being rotated in a tightening direction relative to the spindle 52. Further rotation of the shaft 58 and the inner cylinder 54 in the tightening direction may then rotate the entire winding device 50 and tighten the strap winch 10. Similarly, the engagement bolt 56 is configured to automatically retract inwardly along the radial direction R out of engagement with the engagement holes 26 in the collar 24 in response to the shaft 58 and the inner cylinder 54 being rotated in a loosening direction relative to the spindle 52. Accordingly, the exemplary winding device 50 depicted in FIG. 1 may provide for a more convenient and time efficient manner of rotating the collar 24 of the strap winch 10 in a tightening direction in order to tighten a respective cargo strap. For example, the winding device 50 depicted in FIG. 1 may be operated by a single hand of a user, leaving the user a free hand to, e.g., guide the strap into the strap winch 10.

Figure 2:
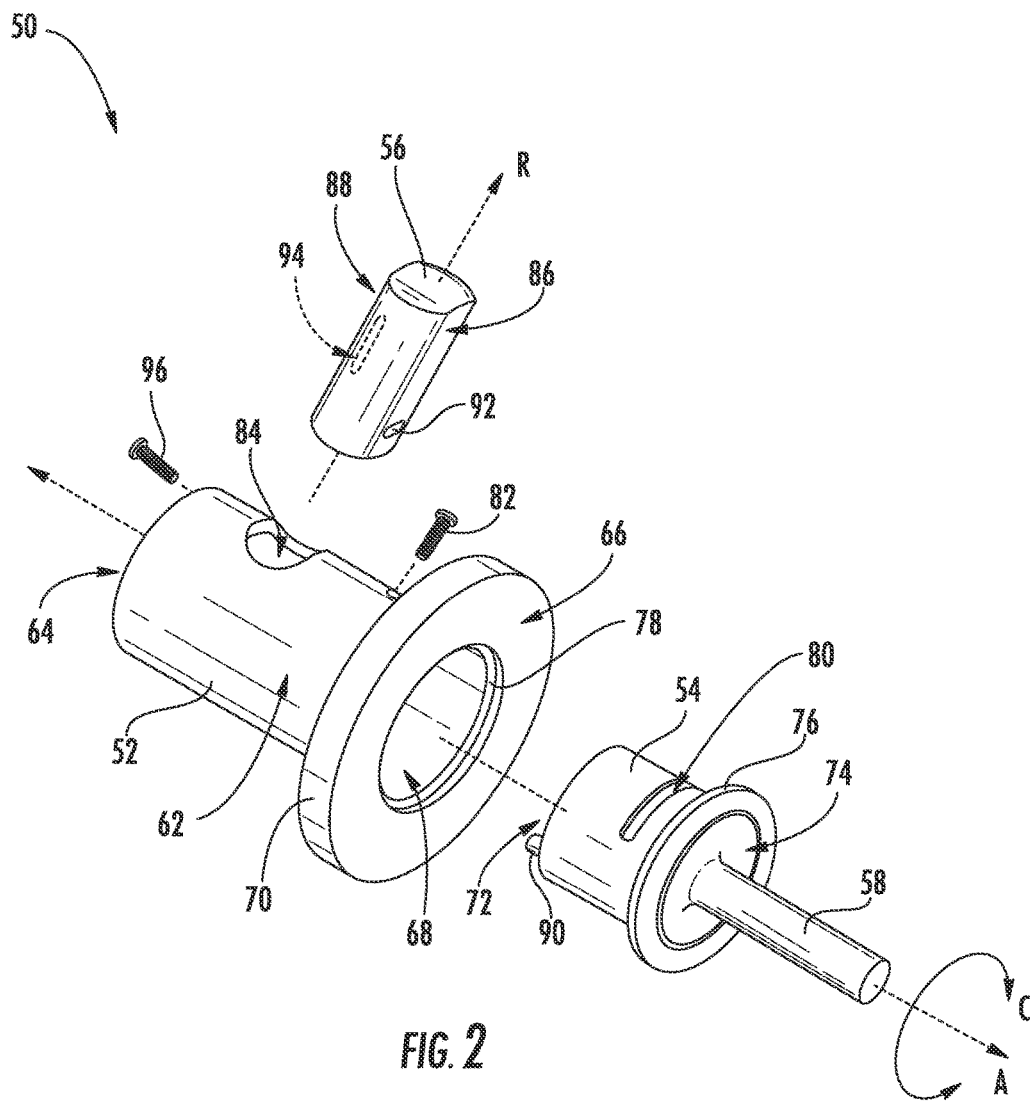
FIG. 2 is an exploded view of the exemplary winding device of FIG. 1.
Figure 3:
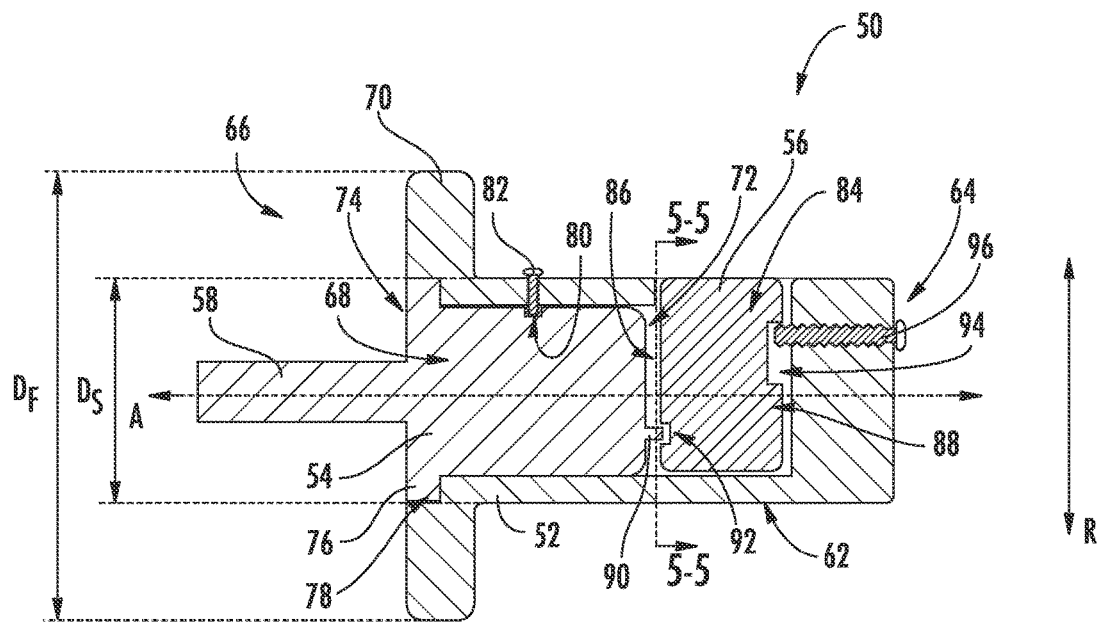
FIG. 3 is a cross-sectional side view of the exemplary winding device of FIG. 1 in a disengaged position.
Figure 4:
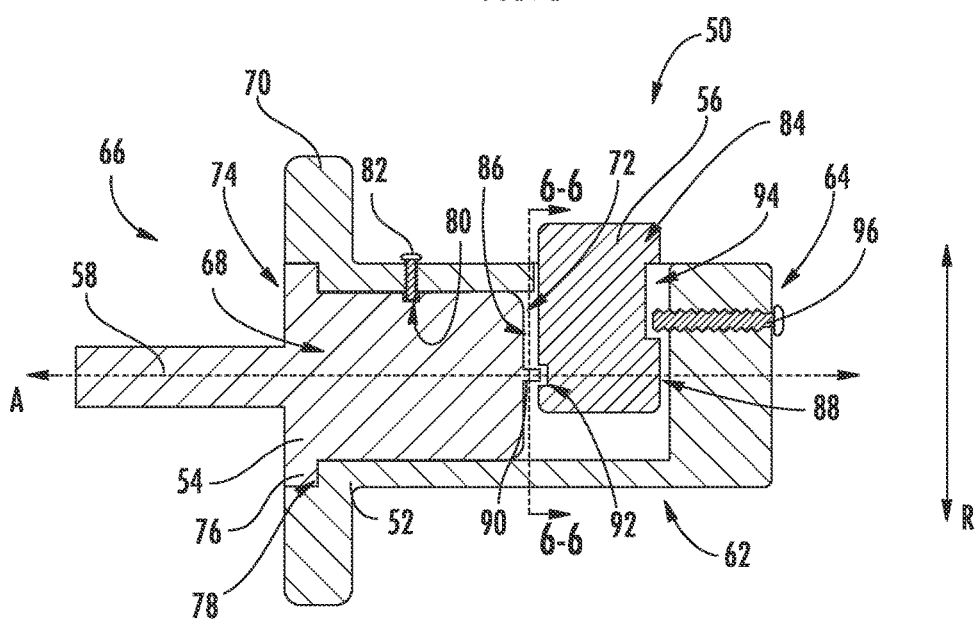
FIG. 4 is a cross-sectional side view of the exemplary winding device of FIG. 1 in an engaged position.

With reference now to FIGS. 2-4, the winding device 50 will be described in greater detail. FIG. 2 provides an exploded perspective view of the exemplary winding device 50 of FIG. 1; FIG. 3 provides a cross-sectional side view of the exemplary winding device 50 of FIG. 1 in a disengaged position; and FIG. 4 provides a cross-sectional side view of the exemplary winding device 50 of FIG. 1 in an engaged position.

The exemplary winding device 50 defines an axial direction A, a radial direction R, and a circumferential direction C, and, as stated, generally includes the spindle 52, the inner cylinder 54, and the engagement bolt 56. The spindle 52 defines a substantially cylindrical outer casing 62 extending along the axial direction A between a first end 66 and a second end 64, the outer casing 62 defining a diameter $D_S$ in the radial direction R (FIGS. 3-4). The first end 66 of the spindle 62 defines a first opening 68 extending along the axial direction A and the second end 64 of the spindle 62 is substantially closed off. For the embodiment depicted, the first opening 68 is configured as a cylindrically shaped axial opening 68.

Extending outwardly along the radial direction R from the spindle 62 at the first end 66 is a flange 70. The spindle 52 is configured for receipt within the collar 24 of the strap winch 10 (see FIG. 1), and the flange 70 is configured to prevent over-insertion of the spindle 52 into the collar 24. Accordingly, the flange 70 defines an effective diameter $D_F$ along the radial direction R (FIG. 3) greater than the diameter $D_S$ of the outer casing 62 and greater than a diameter of the collar 24.

The inner cylinder 54 is positioned at least partially within the axial opening 68 at the first end 66 of the spindle 54 and is rotatable about the axial direction A relative to the spindle 54. More particularly, the inner cylinder 54 defines a first end 74 with a lip 76 extending outwardly along the radial direction R and a second end 72 positioned completely within the axial opening 68 of the spindle 52. The lip 76 is positioned adjacent to a correspondingly shaped shelf 78 extending inwardly along the radial direction R around a circumference of the axial opening 68 in the spindle 52. Such a configuration may constrain the inner cylinder 52 from moving further into the opening 68.

The inner cylinder 54 additionally defines a track or groove 80 extending inwardly along the radial direction R and around approximately ninety (90) degrees of an outer surface of the inner cylinder 54 along the circumferential direction C. A bolt 82 extends along the radial direction R through the spindle 52 and into the groove 80 in the inner cylinder 54. The groove 80 and bolt 82 function to constrain the inner cylinder 54 along the axial direction A and prevent removal of the inner cylinder 54 from the spindle 52. Additionally, the groove 80 and bolt 82 allow the inner cylinder 54 to rotate along a length of the groove 80 about the axial direction A relative to the spindle 52. Accordingly, for the embodiment depicted in FIGS. 2-4, the inner cylinder 54 may rotate approximately ninety (90) degrees about the axial direction A within the spindle 52 and relative to the spindle 52.

It should be appreciated, however, that in other exemplary embodiments, the inner cylinder 54 and spindle 52 may have any other suitable configuration. For example, in other exemplary embodiments, the spindle 52 may not include the flange 70, or alternatively may include any other suitable configuration for preventing over-insertion of the spindle 52 into the collar 24 of the strap winch 10. Similarly, in other embodiments, the inner cylinder 54 may not include the lip 76, and instead the inner cylinder 54 may be constrained along the axial direction A relative to the spindle 52 solely by the groove 80 and bolt 82. Moreover, in still other exemplary embodiments, the groove 80 may have any other suitable depth (along the radial direction R), width (along the axial direction A), or length (along the circumferential direction C). For example, in other embodiments, the groove 80 may extend around the inner cylinder 54 along the circumferential direction C approximately 60 degrees, approximately 75 degrees, approximately 105 degrees, approximately 120 degrees, approximately 150 degrees, approximately 180 degrees, or any length therebetween. Alternatively, however, the groove 80 may extend around the inner cylinder 54 along the circumferential direction C less than approximately 60 degrees or more than approximately 180 degrees. As used herein, terms of approximation, such as "substantially" or "approximately," refer to being within a 10% margin of error.

Referring still to the exemplary embodiment of FIGS. 2-4, the spindle 52 additionally includes a second, radial opening 84 extending along the radial direction R and positioned between the first and second ends 66, 64, with the engagement bolt 56 received therein. The engagement bolt 56 defines a first side 86 and a second, opposite side 88, each of which defining a substantially flat surface in the exemplary embodiment depicted. Moreover, the engagement bolt 56 defines a cross-sectional shape in the radial direction R that is substantially the same as the shape of the radial opening 84 in the spindle 52. Accordingly, the flat surfaces of the first and second sides 86, 88 of the engagement bolt 56 may interact with the radial opening 84 to prevent an amount of rotation of the engagement bolt 56 about the radial direction R.

Within the spindle 52, the engagement bolt 56 is mechanically engaged with the inner cylinder 54. For the exemplary embodiment depicted in FIGS. 2-4, such a mechanical engagement is provided by a lift nub 90 extending away from the second end 72 of the inner cylinder 54 along the axial direction A and a lift groove 92 extending across a width of the first side 86 of the engagement bolt 56 and inwardly along the axial direction A. When the winding device 50 is assembled (FIGS. 3-4), the lift nub 90 on the inner cylinder 54 is received within the lift groove 92 in the engagement bolt 56. As will be explained in greater detail below, the lift nub 90 and lift groove 92 provide for the movement of the engagement bolt 56 along the radial direction R as the inner cylinder 54 is rotated within the spindle 52 and relative to the spindle 52.

The engagement bolt 56 further defines a retaining slot 94 extending inwardly along the axial direction A and along the radial direction R along the second side 88 of the engagement bolt 56. The retaining slot 94 (also shown in phantom in FIG. 2) is configured to receive a bolt 96 extending along the axial direction A through the second end 64 of the spindle 52. The bolt 96 may allow the engagement bolt 56 to move inwardly and outwardly along the radial direction R through the radial opening 84 in the spindle 52 without being completely removed from the radial opening 84 in the spindle 52.

Figure 6:
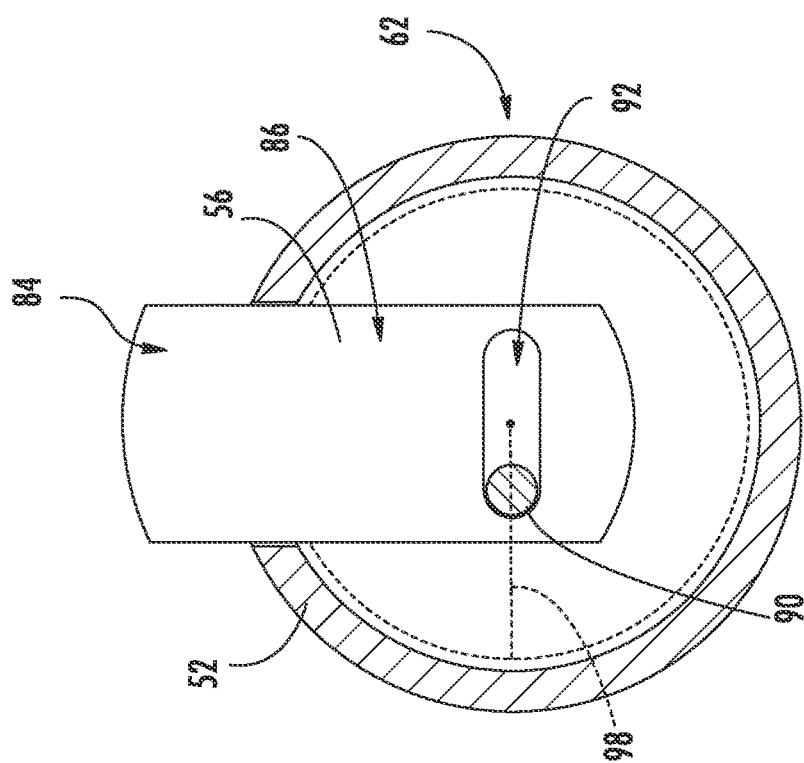
FIG. 6 is a cross-sectional view of the exemplary winding device of FIG. 1 along line 6-6 in FIG. 4.
Figure 5:
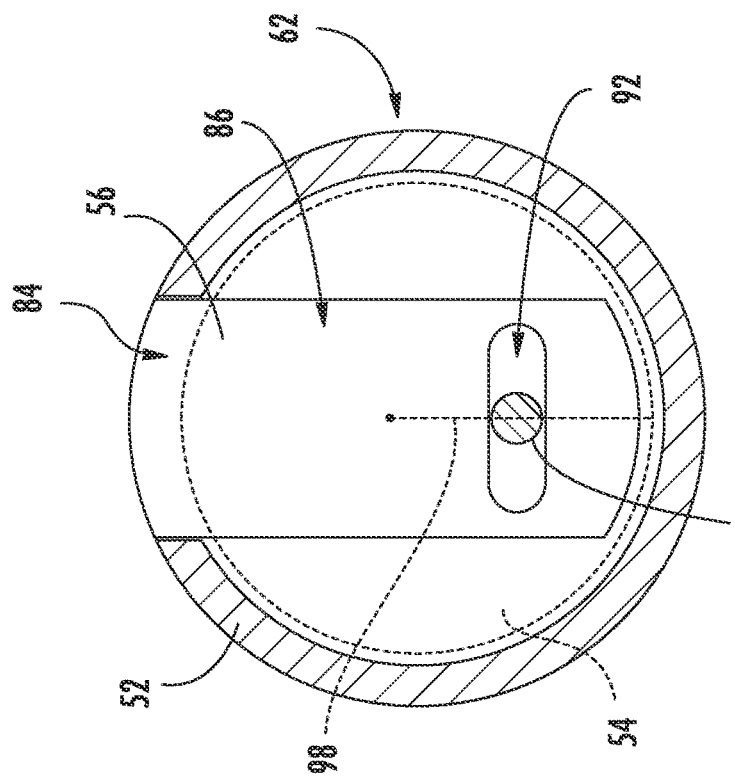
FIG. 5 is a cross-sectional view of the exemplary winding device of FIG. 1 along Line 5-5 in FIG. 3.

With reference now specifically to FIGS. 3 and 4, as well as to FIGS. 5 and 6, operation of the winding device 50 will be more fully explained. FIG. 5 provides a cross-sectional view of the exemplary winding device of FIG. 1 along Line 5-5 in FIG. 3; and FIG. 6 provides a cross-sectional view of the exemplary winding device of FIG. 1 along line 6-6 in FIG. 4.

As is depicted in FIGS. 3 and 5, when the winding device 50 is in the disengaged position the engagement bolt 56 is retracted inwardly along the radial direction R and is positioned substantially within the radial opening 84. Such a configuration may allow for insertion into and/or removal from the collar 24 of the strap winch 10 (see FIG. 1). Conversely, as is depicted in FIGS. 4 and 6, when the winding device 50 is in the engaged position, the engagement bolt 56 is extended outwardly along the radial direction R and is positioned at least partially through the radial opening 84 in the spindle 52. When in the engaged position, the winding device 50 is configured to engage the collar 24 of the strap winch 10. More particularly, in the engaged position, the outer casing 62 of the spindle 52 is configured to be received within the collar 24 and the engagement bolt 56 is configured to extend into and/or through one of the engagement holes 26 in the collar 24 (FIG. 1). Accordingly, when in the engaged position, rotation of the winding device 50 correspondingly rotates the collar 24 of the strap winch 10.

As may be more clearly seen in FIGS. 5 and 6, the winding device 50 is moved from a disengaged position to an engaged position automatically in response to rotation of the inner cylinder 54 relative to the spindle 52 in a tightening or loosening direction. A radial line 98 is included in phantom in FIGS. 5-6 for reference. The inner cylinder 54 is rotatable about the axial direction A between a first position (FIG. 5) and a second position (FIG. 6) relative to the spindle 52. More particularly, the inner cylinder 54 may be rotated a fixed amount relative to and within the spindle 52 based on a length of the groove 80 and the radial bolt 82 and/or based on a length of the retaining slot 94 and bolt 96.

For example, in the first position, the inner cylinder 54 may be positioned at a starting zero degrees relative to the spindle 52 (see FIG. 5, line 98) and a first end of the groove 80 may abut the radial bolt 82. This may prevent the inner cylinder 54 from being rotated within the spindle 52 in a counter-clockwise direction (as viewed in FIG. 5). The counter-clockwise direction may correspond to the loosening direction of the collar 24 of the strap winch 10. Additionally, when the inner cylinder is in the first position, the lift nub 90 holds the engagement bolt 56 within the radial opening 84, keeping the winding device 50 in the disengaged position.

Moreover, in the second position, the inner cylinder 54 may be positioned at ninety (90) degrees relative to the spindle 52 (see FIG. 6, line 98), and a second end of the groove 80 may abut the radial bolt 82. This may prevent the inner cylinder 54 from being rotated within the spindle 52 in a clockwise direction (as viewed in FIG. 6). The clockwise direction may correspond to the tightening direction of the collar 24 of the strap winch 10. Accordingly, when in the second position, rotation of the inner cylinder 54 in a clockwise direction also moves the spindle 52 in a clockwise direction. Therefore, rotating the inner cylinder 54 may additionally rotate the collar 24 and tighten the strap winch 10 when the winding device 50 is in the engaged position.

Notably, when the inner cylinder 54 is rotated from the first position (FIG. 5) to the second position (FIG. 6), the inner cylinder 54, or more particularly the lift nub 90, engages the lift groove 92 in the engagement bolt 56 and automatically extends the engagement bolt 56 along the radial direction R through the radial opening 84—thus, positioning the winding device 50 in the engaged position. By contrast, when the inner cylinder 54 is rotated from the second position (FIG. 6) to the first position (FIG. 5), the inner cylinder 54, or more particularly the lift nub 90, engages the lift groove 92 in the engagement bolt 56 and automatically retracts the engagement bolt 56 along the radial direction R into the radial opening 84—thus, positioning the winding device 50 in the disengaged position.

It should be appreciated, however, that in other exemplary embodiments of the present disclosure, the winding device 50 may have any other suitable configuration for automatically extending and/or retracting the engagement bolt 56. For example, in other exemplary embodiments, the inner cylinder 54 may define an asymmetric shape at the second end 72 that acts like a cam system to extend the engagement bolt 56 when rotated.

The exemplary embodiment of the winding device 50 described above may allow for an improved method of winding a collar 24 of a strap winch 10. For example, a user may insert the spindle 52 into the collar 24 of the strap winch 10 with the winding device 50 in a disengaged position (FIG. 3). Once inserted, the user may rotate the shaft 58 and the inner cylinder 54 from a first position to a second position in a tightening direction relative to the spindle 52, such that the winding device 50 is in the engaged position (FIG. 4). The tightening direction of the winding device 50 may correspond to a tightening direction of the collar 24. More particularly, rotation of the shaft 58 and the inner cylinder 54 may engage the engagement bolt 54 with the inner cylinder 54 and extend the engagement bolt 56 along the radial direction R of the winding device 50. In the engaged position, the engagement bolt 56 of the winding device 50 may extend into and/or through one of the engagement holes 26 in the collar 24. After the winding device 50 is fully moved to the engaged position, the radial bolt 82 and groove 80 will prevent any further rotation of the inner cylinder 54 relative to the spindle 52 and thus the entire winding device 50 will rotate when the inner cylinder 54 is rotated in the tightening direction. Accordingly, the user may then tighten the strap winch 10 via the collar 24 by rotating the inner cylinder 54 of the winding device 50. Rotation of the inner cylinder 54 may be assisted by use of a drive apparatus 60, such as a corded or cordless drill attached to the shaft 58 (FIG. 1).

Once the strap winch 10 is tightened to the satisfaction of the user, the user may rotate the inner cylinder 54 in an opposite, loosening direction within the spindle 52 and relative to the spindle 52. Rotation of the inner cylinder 54 in a loosening direction relative to the spindle 52 will automatically retract the engagement bolt 56 such that the winding device is automatically moved to the disengaged position. Once in the disengaged position, the user may remove the winding device 50 from within the collar 24 of the strap winch 10 without having to manually press in or retract the engagement bolt 56.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other and examples are intended to be within the scope of the claims if they include structural elements that do not differ from the literal language of the claims, or if they include equivalent structural elements with insubstantial differences from the literal language of the claims.

What is claimed:

1. A winding device configured for use with a collar of a strap winch, the winding device defining an axial direction and a radial direction, the winding device comprising:
   a spindle extending along the axial direction between a first end and a second end and configured for receipt into the collar of the strap winch at the second end, the spindle defining a first opening at the first end extending along the axial direction and a second opening between the first end and the second end extending along the radial direction;
   an inner cylinder positioned at least partially in the first opening of the spindle and rotatable about the axial direction between a first position and a second position relative to the spindle; and
   an engagement bolt positioned at least partially in the second opening of the spindle and mechanically engaged with the inner cylinder such that rotation of the inner cylinder from the first position to the second position extends at least a portion of the engagement bolt outwardly along the radial direction from within the second opening in the spindle.

2. The winding device of claim 1, further comprising a shaft extending along the axial direction attached to the inner cylinder.

3. The winding device of claim 1, further comprising a flange extending along the radial direction outwardly from a first end of the spindle.

4. The winding device of claim 1, wherein the inner cylinder further comprises a lift nub extending along the axial direction away from a second end of the inner cylinder, wherein the engagement bolt defines an engagement slot extending across a width of the engagement bolt and inwardly along the axial direction, and wherein the lift nub is received within the engagement slot.

5. The winding device of claim 1, wherein the engagement bolt is configured to extend into or through an engagement hole of the collar of the strap winch when the inner cylinder is in the second position.

6. The winding device of claim 1, further comprising
   a bolt extending generally along the radial direction through an opening in the spindle and into a groove defined in the inner cylinder extending along a circumferential direction of the winding device.

7. The winding device of claim 6, wherein the groove defined in the inner cylinder extends between about 60 degrees and about 180 degrees around the inner cylinder.

8. The winding device of claim 6, wherein the groove defined by the inner cylinder defines a length, and wherein the length of the groove determines an amount of rotation allowable between the spindle and the inner cylinder.

9. The winding device of claim 1, further comprising
   a bolt extending generally along the axial direction through an opening in the spindle into a retaining slot defined by the engagement bolt, wherein the retaining slot defined by the engagement bolt extends generally along the axial direction.

10. The winding device of claim 9, wherein the retaining slot defined by the engagement bolt defines a length along the radial direction, and wherein the length of the retaining slot determines an amount of movement allowable between the engagement bolt and the spindle.

11. The winding device of claim 9, wherein the bolt extending generally along the axial direction maintains at least a portion of the engagement bolt within the spindle during operation of the winding device.

* * * * *